United States Patent [19]

Thompson

[11] Patent Number: 4,658,112

[45] Date of Patent: Apr. 14, 1987

[54] WELDING CONTROL BY POWER INTEGRATION

[75] Inventor: Floyd M. Thompson, Spring, Tex.

[73] Assignee: CRC-Evans Pipeline International, Inc., Houston, Tex.

[21] Appl. No.: 821,158

[22] Filed: Jan. 21, 1986

[51] Int. Cl.$^4$ .............................................. B23K 9/12
[52] U.S. Cl. ........................... 219/125.12; 219/124.22; 219/124.34
[58] Field of Search ...................... 219/125.12, 124.22, 219/124.34

[56] References Cited

U.S. PATENT DOCUMENTS 4,151,395  4/1979  Kushner et al. ................. 219/125.12
4,158,124  6/1979  Connell ........................... 219/125.12
4,446,353  5/1984  Connell ........................... 219/125.12

Primary Examiner—Clifford C. Shaw
Attorney, Agent, or Firm—Richards, Harris, Medlock & Andrews

[57] ABSTRACT

This invention relates to automatic welding of confronting edges of two bodies between which is a groove to be filled with a material and, more particularly, to conditioning, processing and use of control signals representative of an integration of the absolute product of the differences between the arc voltage at the sidewall and the centerline arc voltage and the arc current at the sidewall and the centerline current for an integration window near the sidewall for automatic reversal of the traversing welding torch.

8 Claims, 17 Drawing Figures

WELDING CONTROL BY POWER INTEGRATION3

TECHNICAL FIELD

This invention relates to the automated welding of elements with a traversing torch assembly controlled by sensing power changes at the limits of the traverse compared to the power at the center line of the weld.

BACKGROUND OF THE INVENTION

Semiautomatic welding operations where filler wire is utilized in connection with welding adjacent faces of materials such as pipelines is known. In U.S. Pat. No. 4,151,395, the problem of welding joints by filling grooves defining a weld path between work pieces is described. Large pipe sections are thus joined together in an end-to-end relationship. Thus, it is common practice to move a welding heat source such as an arc welding torch or like instrument along a predetermined weld path relative to the work while fusing and depositing filler metal in the gap from a consumable electrode source.

A welding machine is disclosed in said patent which travels on a guide band secured near the end of a pipe section which is to be welded to an adjacent pipe section. As such welding machine travels along the length of the groove to be filled, the arc is oscillated laterally, weaving back and forth across the groove. It is to be controlled in center position as well as oscillation width.

Various proposals have been made for tracking a groove between adjacent parts with external sensors of optical, mechanical or magnetic types suggested.

In U.S. Pat. No. 4,151,395, the signals employed are conditioned where characteristics of the arc itself are sensed for providing the necessary signal input.

In U.S. Pat. No. 4,158,124, a system is disclosed wherein the weld current is integrated as it approaches a groove sidewall. The integral is then compared with a reference voltage so that when the arc reaches a position within a predetermined proximity of the sidewall, the lateral travel will be arrested and thereafter reversed to travel under similar control toward the opposite sidewall. The maintenance of center line position and width are both accomplished in the same operation.

SUMMARY OF THE INVENTION

The present invention is directed to a system in which the control signals are generated and conditioned to be more reliable in welding operations than heretofore possible.

In accordance with the invention, automatic arc welding involves a weld torch which consumes an electrode to deposit filler material in a weld groove while weaving across the groove during travel along the length of the groove. Means are provided for producing an arc power integral signal representative of the integral of the product of the absolute difference between a sampled weld voltage and a center line voltage and the absolute difference between a sampled weld current and the center line current near the end of each lateral traverse. Means are provided to arrest travel of the arc on each traverse and reverse the movement each time the integral power value reaches a predetermined integration power constant.

BRIEF DESCRIPTION OF THE DRAWINGS

For a more complete understanding of the invention, reference may now be had to the following description taken in conjunction with the accompanying Drawings in which.

DESCRIPTION OF THE PREFERRED EMBODIMENT

A. Current Integration System

FIGS. 1-10 and the disclosure under this heading disclose a pipeline welding control system incorporating a traversing torch assembly which is controlled by the integration of the welding current measured during a window of time near the limit of each traverse of the torch assembly which stops the traverse when the integration value equals a predetermined constant determined by a current integration from prior traverses. This system is fully disclosed and claimed in U.S. Pat. No. 4,495,400 issued to the same inventor as the present application and assigned to the same corporation as the present application. The disclosure from this patent is incorporated bodily in the present application hereafter under heading A.

Figure 1:
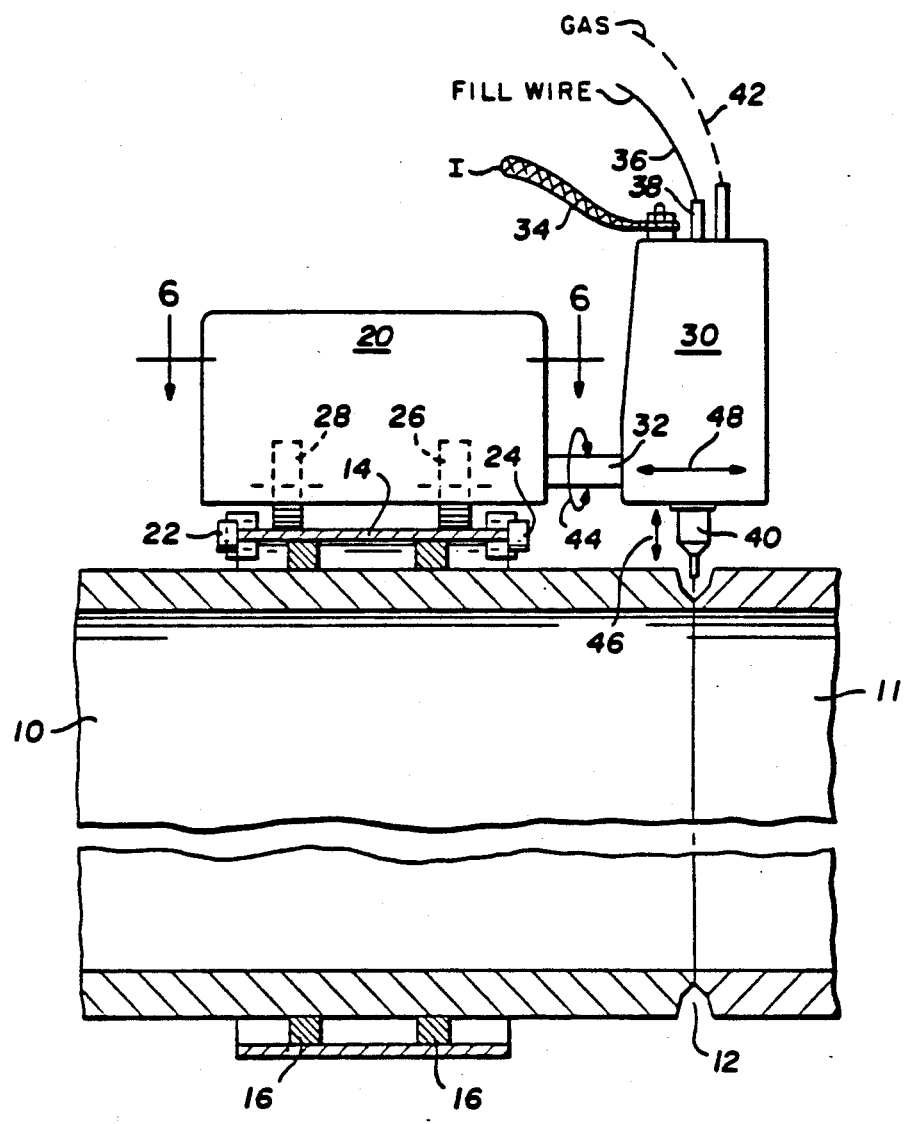
FIG. 1 illustrates a system according to the present invention in a pipeline welding operation.

FIG. 1 illustrates a pipeline welding operation wherein a pipe 10 is adjacent to and confronts in an end-to-end relation a second pipe 11. The ends of pipes 10 and 11 are beveled so that together, a groove 12 is formed along which pipe material is to be melted and fused while depositing filler material in the groove 12 through use of a gas shielded arc.

A guideband track 14 is secured to the outer surface of pipe 10 and is spaced therefrom by spacers 16. A welding bug 20 is mounted on track 14 and which comprises a first set of followers 22 and a second set of followers 24, each comprising three rollers which engage and follow the inner, edge and outer surfaces of band 14. By this means, bug 20 will follow a path around pipe 10 which is generally a constant distance from groove 12. Bug 20 is provided with a pair of drive wheels 26 and 28 which engage the outer surface of band 14 and which are propelled by a suitable motor (not shown) for moving the bug 20 along band 14 at controlled velocities.

In accordance with the present invention, a torch assembly 30 is mounted on a compound shaft 32 which extends from the side of bug 20. Torch assembly 30 is supplied by way of a cable 34 with welding current. Filler wire 36 is supplied by way of a guide tube 38 to pass downward through torch assembly 30 and emerge through a nozzle 40. Shielding gas from a suitable source is supplied by way of tube 42 to shield the arc at the end of filler wire 36 as it emerges from nozzle 40 and for the duration of such time as an arc exists between the filler wire tip below nozzle 40.

Current in the arc is sensed and utilized for control of movement of the torch assembly 30 relative to bug 20. The compound shaft 32 provides for rotation of the torch assembly 30 about the axis of shaft 32 as indicated by arrow 44 so that the head angle between the nozzle 40 and pipes 10 and 11 can be selectively adjusted.

Motion is also conveyed through shaft 32 so that the distance between the nozzle 40 and the groove 12 can be varied in accordance with arrow 46.

Further, the torch assembly 30 can be moved laterally as indicated by arrow 48 to weave back and forth across the gap 12 with the welding tip extending from nozzle 40.

OPERATION

Before describing the present signal processing and utilization system, it will be helpful to outline in sequence the operations that are to be achieved in automatic operation.

The following operations take place:

(1) The bug 20 is mounted on the guideband 14.

(2) An electrical master switch is turned on.

(3) The system then undergoes a routine to seek the surface of pipe 10 or 11:
  (a) First, the weld head angle is set typically to 6 to 7 degrees either lead or lag depending upon position and direction. The head angle can be set up to ±45° from perpendicular as per arrow 44.
  (b) After the head angle is set, the system undertakes to seek the work. The torch is lowered until it makes electrical contact with the work. A constant current source is connected to an electrical conductive part of the welding nozzle and change in that circuit is sensed.
  (c) After the work has been touched, the torch is backed up to the point that represents the desired filler wire stick-out length. The filler wire 36 is then fed through the torch assembly 30 until the wire makes contact with the work.
  (d) The torch then backs up approximately ¼".

(4) Next, the welding groove is located:
  (a) In the pipeline application, the approximate position of guideband 14 with respect to the groove 12 is known. The torch assembly 30 is moved by shaft 32 to a predetermined position, approximately at the center of groove 12.
  (b) Nozzle 40 is then lowered approximately ½" to enter groove 12. Then nozzle 40 is driven to the right to contact the right sidewall of groove 12 and then driven to the left to contact the left sidewall, both being sensed upon electrical contact.

(5) The position data for the right sidewall is stored and the position data for the left sidewall is stored. The right is then subtracted from the left and the difference divided in half to determine the groove center. The center position data is stored.

(6) Nozzle 40 is then driven down into the groove as per arrow 46 until electrical contact is made with the groove center. This finds the bottom of the weld site by electrical contact. The torch then backs up approximately 1/16". The right side is contacted again and the left side is contacted again and this now provides the original start width of oscillation. The nozzle 40 then is moved back to the center line.

(7) The gas and electrical power are then turned on and a gas pre-purge cycle extends a period of time of approximately ½ second during which gas flows to purge air out of the torch and the gas line 42.

(8) Upon completion of the purge cycle, the wire feeder is turned on to commence welding. The arc is started when the wire touches the work.

(9) During a quarter-second delay next occurring, nothing is done with the torch. Everything is left in position in the groove center while the arc is established.

(10) After the quarter-second delay, oscillation starts to the predetermined width for a total of 4 cycles. The width is as determined by the original mechanical width that was set by the seek routine. During the first 4 cycles, a width count is accumulated as an actual integration constant:
  (a) The torch moves from center to the right on the first excursion.
  (b) A down counter is loaded with a very large number. The down counter is turned on at an aperture window for the integration which begins a given distance away from the sidewall, approximately 20 thousandths of an inch from the sidewall. In the first 4 cycles, every time the arc approaches the sidewall, an integration window opens.
  (c) The counter counts down from a preset number at a rate representative of the actual current density while the arc nears the sidewall.
  (d) The analog value of current is converted to frequency which is, thus, variable and proportional to the analog input current minus base line current as sampled at the center of groove 12.
  (e) The counter counts down until the torch reaches the original mechanical width limited and stops the counter. The counter contents are read. The number in the counter is subtracted from the original preset value and that difference becomes a value of the integration constant, C. The same operation is repeated a total of 8 times, i.e., 4 complete cycles. The 8 samples are taken and a root mean square average is obtained.
  (f) The root mean square is the average of the number left in the counter. That then becomes the integration constant, C, for the remainder of the weld.

(11) (12) During the first 4 cycles, each time the torch passes through center line, one weld current sample is taken. To that, one sample is added for every subsequent center crossing.

(13) After the first 4 cycles, automatic centering circuits turn on. The first 4 cycles are fixed width, as fixed by the sidewall located in search routine. Once the torch to work current is determined and the integration constant, C, is set, those values are used as reference for the rest of the weld.

(14) On the 5th cycle, having completed extracting the above data, a sample is taken at the center line and compared to the original R.M.S. average and a correction is made if the center line sample is lower or higher. If the current is higher than the original average, the torch is moved up. The relationship is such that approximately 1 millimeter change in filler wire stick-out caused 1% change in current density.

(15) The arc proceeds toward the sidewall until the integration start point is again passed, i.e., approximately 20 thousandths from where the sidewall was. This distance is a variable that can be selected depending on the desired process. Normally about 20 thousandths is selected. At that point, the down counter loads the integration constant, C, i.e., the average of the number determined over the first 4 cycles. With that number in the counter, a current subtraction takes place in which the base line current is subtracted.

The base line current is the center value and is subtracted from the incoming welding current. The difference is then integrated from the start of the integration window. The integration takes place over a small window at the ends of each traverse.

(16) The down counter acts as an integrator or accumulator. When it reaches zero, counting down from a preset number, the weave motor stops.

(17) A dwell is establsihed at the end of each traverse. Then the torch cycles back across the weld.

(18) During the dwell time, a torch to work correction is made. Information collected at the center is used for corrections made during the dwell time. That prevents interaction between the torch to work control and the automatic centering.

FIGS. 2-5

Figure 2:
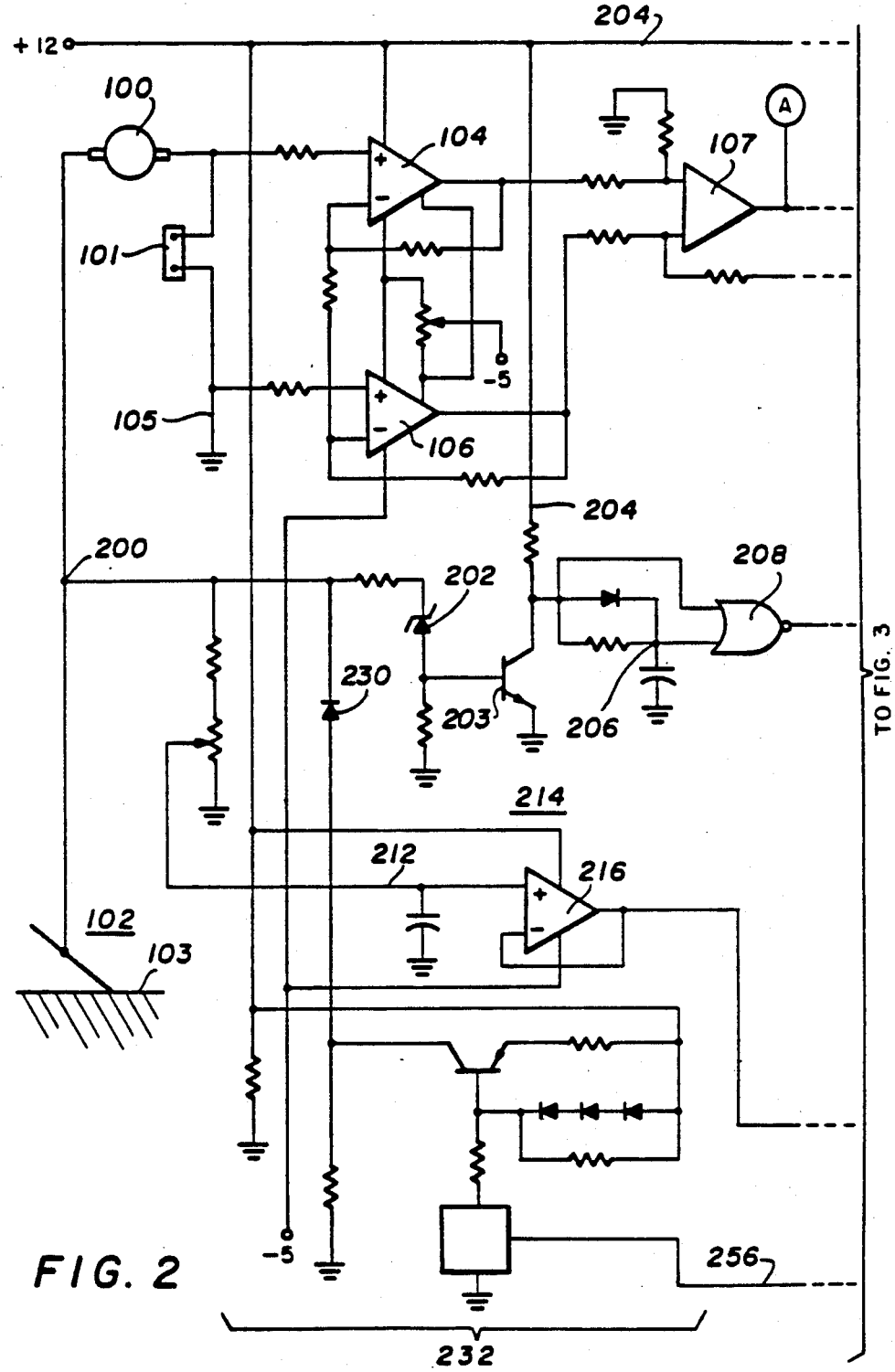
FIGS. 2, 3 and 4 comprise a circuit diagram for signal conditioning and control in operating a system such as shown in FIG. 1 by integrating current.
Figure 3:
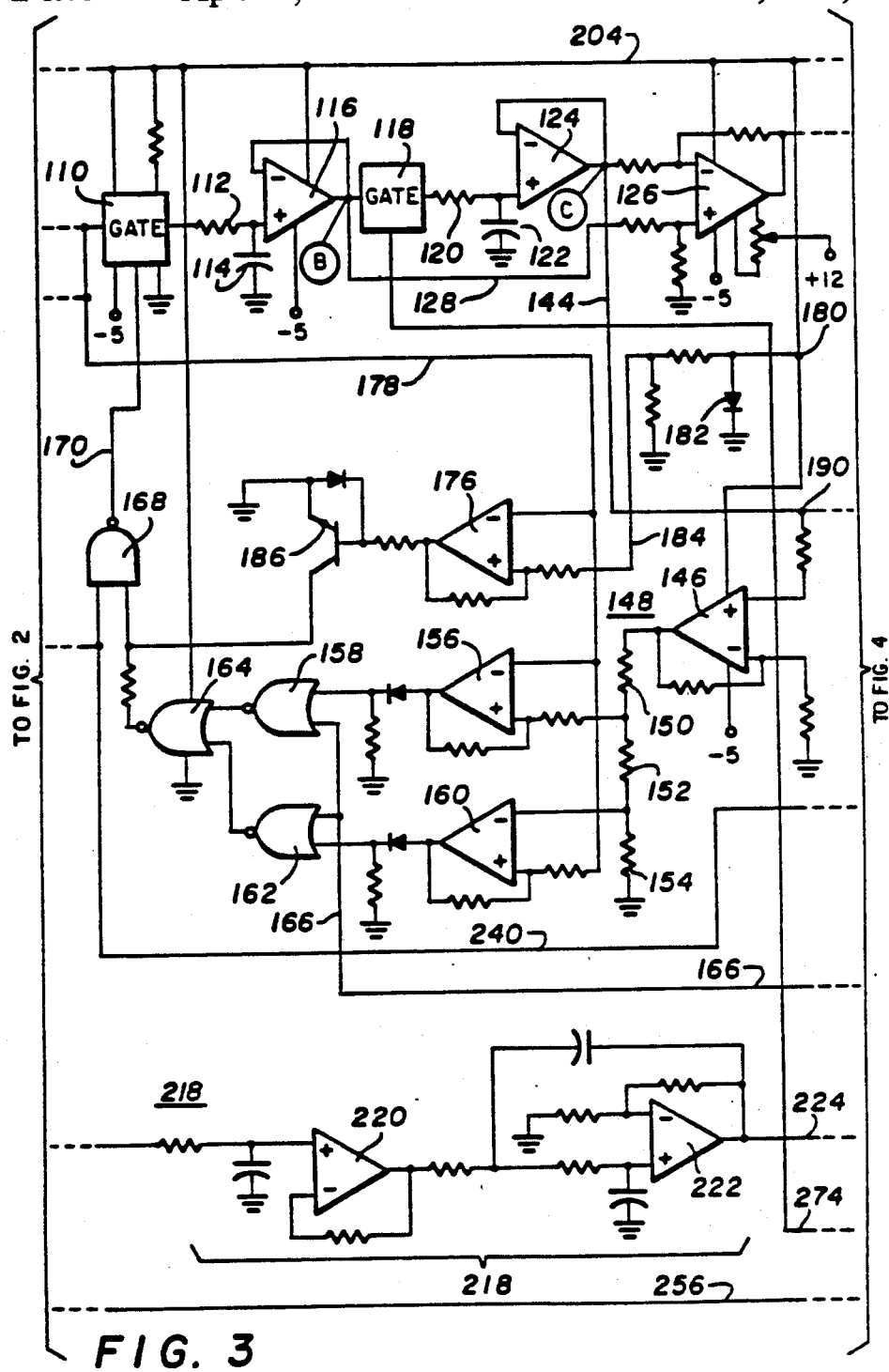
Figure 4:
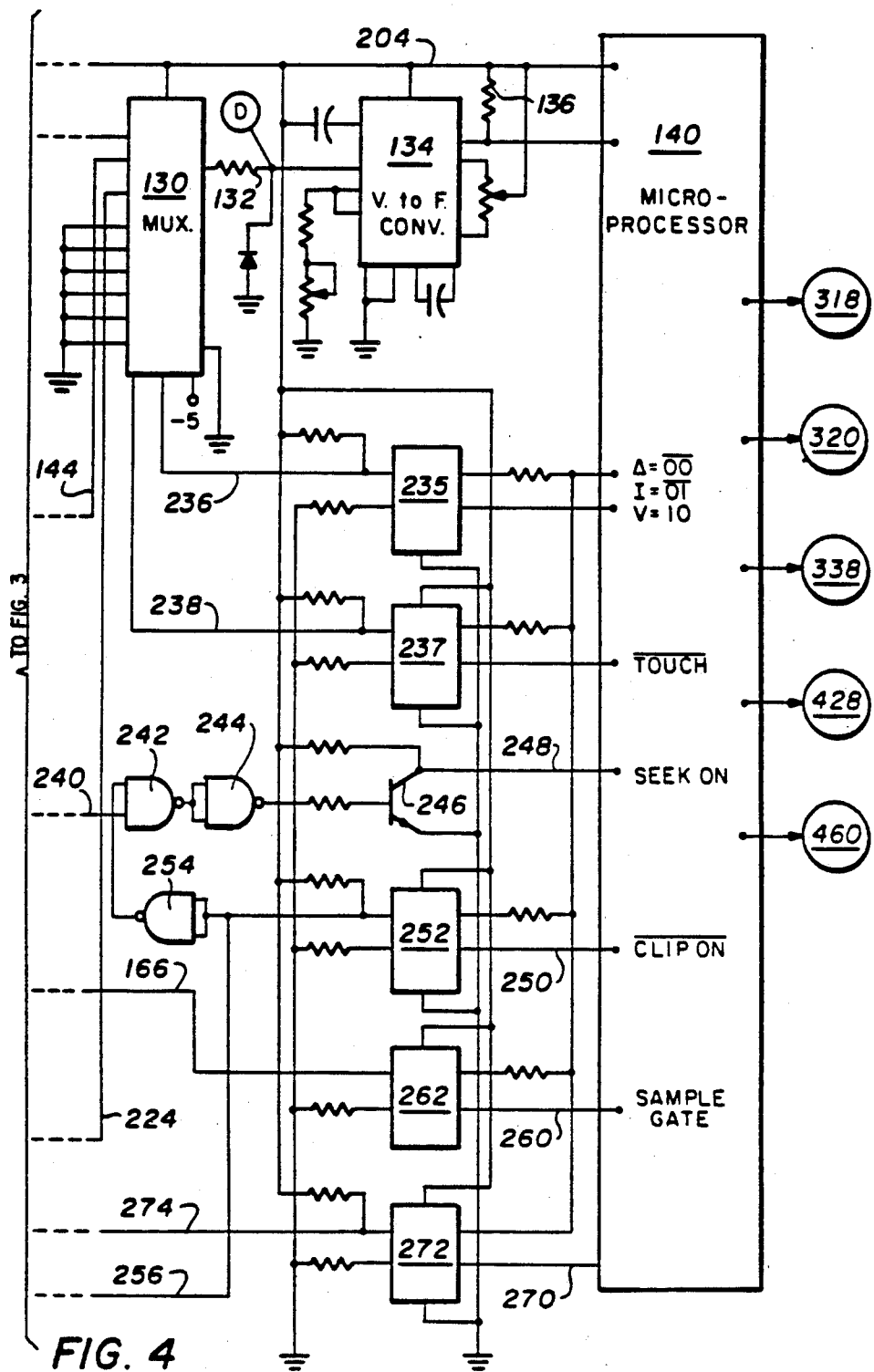

With the foregoing in mind as to functions to be performed, refer now to the signal conditioning and use circuit of FIGS. 2-4 which are to be joined together to form a composite circuit diagram.

In FIGS. 2-4, a welding control system has been illustrated partially in block diagram form.

A weld current generator 100 is connected to a current shunt 101 at its negative voltage terminal. The positive terminal is connected to a welding torch 102 which serves to contact a work piece 103.

The terminals of shunt 101 are connected to the input terminals of an amplifier. More particularly, the positive terminal of shunt 101 is connected to an input of an amplifier 104. The negative terminal of shunt 101 is connected to a ground terminal 105 and to the input to an amplifier 106. Amplifiers 104 and 106 together with amplifier 107 provide a gain of about 25 for the voltage across shunt 101.

The output of amplifier 107 is then connected to a transmission gate 110. The output of gate 110 is connected to an integrator sample and hold unit comprising resistor 112 and capacitor 114. The voltage across capacitor 114 is then applied to a voltage follower amplifier 116. The output of amplifier 116 is then connected by way of a transmission gate 118 to a second sample and hold integrator comprising resistor 120 and capacitor 122. The voltage across capacitor 122 is then connected to a voltage follower amplifier 124 whose output is connected to the input of subtracting amplifier 126. The second input of subtracting amplifier 126 is provided by way of line 128 which leads from the output of voltage follower 116. Thus, the voltage output from the subtractor circuit represents the difference between the voltage across the capacitor 122 and the voltage across the capacitor 114.

Integrator 112, 114 has a relatively short time constant. By way of example, resistor 112 may be 33,000 ohms and capacitor 114 may be 0.1 microfarads to provide an integrator having a corner frequency of about 300 Hz. In contrast, the integrator 120, 122 may be a corner frequency of about 68 Hz where, for example, resistor 120 is 68,000 ohms and capacitor 122 is 1.0 microfarads.

The output of subtractor 126 is then applied to an analog multiplexing gate 130. The output of gate 130 is then applied by way of resistor 132 to the input to a voltage-to-frequency converter 134. The output of converter 134 then appears across resistor 136 at the input of a microprocessor controller 140.

In the portion of the system of FIGS. 2-4 thus far described, provision has been made for sensing the current flow through the shunt 101 and for providing a short-time constant integral signal from integrator 112, 114 and a long-time constant integral signal from integrator 120, 122. The two signals are then subtracted in unit 126 and applied by way of multiplexer 130 to voltage-to-frequency converter 134 to provide an output signal, the utilization of which will be described further.

Figure 5:
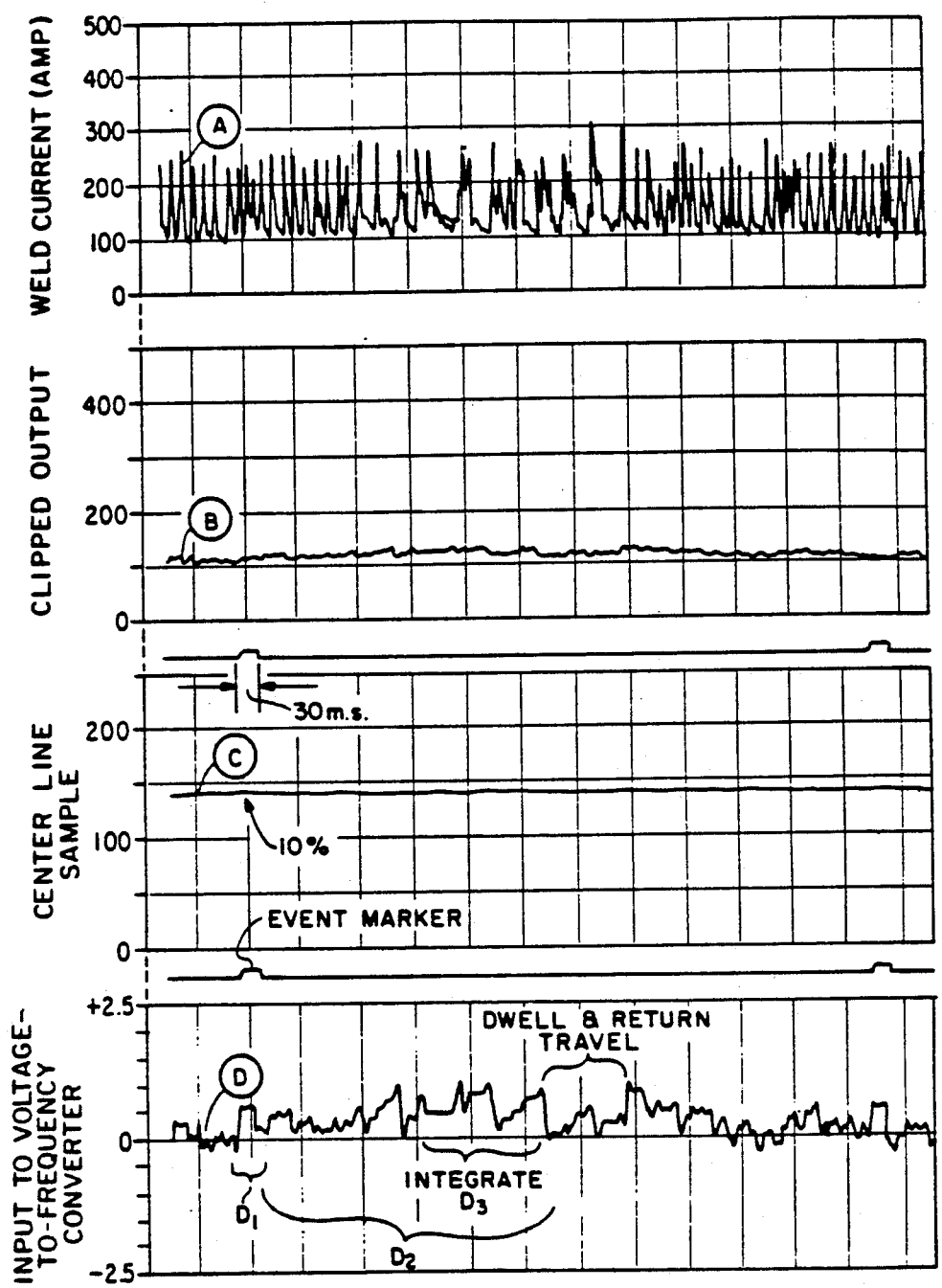
FIG. 5 illustrates wave forms of the signals appearing at selected points in the system of FIGS. 2-4.

Trace A of FIG. 5 depicts a wave form of typical weld current as appearing across shunt 101. Because of the unpredictable and erratic nature of the current flow in a welding arc, utilization of the sampled arc current can be significantly enhanced by selectively filtering.

As shown in FIGS. 2-4, provision is made for clipping the weld current when it exceeds a predetermined limit above a normal selected level or when it falls below by a predetermined amount the same selected level.

More particularly, it will be noted that the output of the voltage follower 124 is applied by way of line 144 to the input of an amplifier 146 which provides an output which is applied to a voltage divider 148. The output voltage from amplifier 146 is twice the magnitude of the input voltage.

The voltage divider 148 is a precision voltage divider. It includes three resistors in series. In a preferred embodiment, resistor 150 was 4.02K ohms. Resistor 152 was 1.5K ohms. Resistor 154 was 4.53K ohms. The circuit controls clipping of the weld current anytime the current exceeds by 20% a preset value and will clip anytime it falls below 90% of the preset value.

More particularly, as shown in FIGS. 2-4, the voltage at the juncture between resistors 150 and 152 is applied to a Schmidt trigger unit 156, the output of which is applied to one input of a NOR gate 158. Similarly, the juncture between resistors 152 and 154 is connected by way of a Schmidt trigger 160 to a second NOR gate 162. Gates 158 and 162 are then connected to the respective inputs of a NOR gate 164. Gates 158 and 162 are controlled or enabled by a suitable control voltage on line 166.

The output of NOR gate 164 is connected to an input of an NAND gate 168, the output of which is applied by channel 170 to the control input of the transmission gate 110.

In operation, when gate 158 is enabled, if the current through shunt 101 exceeds a preset level by more than 20%, then the transmission gate 110 is disabled and the voltage across the integrator 112, 114 remains fixed. Similarly, if the weld current falls more than 10% below the nominal fixed value, then gate 162 is enabled and transmission gate 110 is disabled, again holding the voltage on the integrator 112, 114 at a fixed value.

In addition to the foregoing circuits which provide for clipping action, there is also provided a low current clipper which involves control of a Schmidt trigger 176. More particularly, the voltage at the output of amplifier 107 is supplied by way of channel 178 to one input of Schmidt trigger 176. Thus, the current on channel 178 is to be compared against a reference. The reference voltage is supplied from a terminal 180. The reference voltage appears across diode 182. The voltage across diode 182 is divided down by resistors connected thereto and the reference voltage is applied by way of channel 184 to the second input of the Schmidt trigger 176. The output of trigger 176 is then applied by way of transistor 186 to one input of the NAND gate 168.

In operation, the circuit is arranged so that where the nominal welding current is from 150 to 200 amperes, the low current clipper circuit will operate to disable the transmission gate 110 when the weld current drops to a level of the order of 90 amperes.

By the foregoing treatment of the weld current, a difference voltage is applied through multiplexer 130 to the voltage-to-frequency converter 134. In addition, the output of the long-term integrator 120, 122 is applied by way of channel 190 to a second input of multiplexer 130. This is to supply a current dependent signal from which there is developed a base current signal, i.e., a sample representing current value at the center of the traverse.

Having treated the processing of the current sample from the shunt 101, there will now be described processing of the arc voltage in order to provide a control for the transmission gate 110 when the arc voltage drops below a predetermined level. Assume that the arc voltage is normally about 25 volts.

The arc voltage from terminal 200 is applied by way of zener diode 202 to the input or base of transistor 203. By operation of diode 202 when the arc voltage falls below the diode threshold of about 6 volts, then transistor 203 is turned off, causing the collector to rise to the voltage level of power supply 204. The voltage at the collector terminal is then applied by way of a time delay circuit 206 to a NOR gate 208 which in turn is connected to a second input of NAND gate 168. By this means, sampling of the current from shunt 101 is arrested if the arc voltage falls below the level set in the voltage clipoer circuit.

It will be further noted that the terminal 200 is connected by way of channel 212 to an arc voltage sample circuit 214. The arc sample circuit includes a buffer amplifier 216 and a low pass filter 218 which has a corner frequency, for example, of about 5 Hz. Filter 218 is a third order low pass filter. It includes amplifier 220 and 222 connected by way of channel 224 to a third input of the multiplexer 130. By this means, the arc voltage level can be monitored and utilized by way of a signal output from the voltage-to-frequency converter 134 and selectively appearing across the resistor 136.

Terminal 200 is also connected by way of a diode 230 to a circuit 232 which comprises a constant current source to be used by the system when seeking to determine the location of the walls of the weld groove as earlier described.

The microprocessor 140 is provided to control use of the signals appearing across the output resistor 136 and for providing control inputs to the remainder of the system.

One of the functions of the microprocessor 140 is to provide a two-bit address signal for the control of multiplexer 130. When the system is in a subtractor mode, that is when the voltage across the output impedance 136 is to represent on a frequency variable basis the difference between the signals at the input of subtractor 126, the voltage from coupler 235 on line 236 and the voltage from coupler 237 on line 238 will be high. When the voltage across resistor 136 is to represent the value of the current as at the mid-point of its traverse, then line 236 will be high and 238 will be low. When the signal across resistor 136 is to represent the voltage at terminal 200, the signal on line 236 will be low and the signal on line 238 will be high. The control of multiplexer 130 is programmed in processor 140.

So long as the output of the NOR gate 208 is low, i.e., the weld voltage exceeds about 6 volts, the output will be low. The output of NOR gate 208 is connected by way of channel 240 to one input of a NAND gate 242, the output of which is connected to both inputs of NAND gate 244, whose output in turn is connected to the base of transistor 246. The collector of transistor 246 is connected to output terminal 248 leading to microprocessor 140.

In the seek routine, when the welding tip 102 touches the work piece, the weld voltage drops to a low value such that the state on channel 240 is changed. The change is then reflected by a change in the state at the output terminal 248 to signal that a sidewall has been touched.

Terminal 250 leads from microprocessor 140 to an optical coupler 252, the output of which is connected to both inputs of a NAND gate 254. The output of NAND gate 254 controls the second terminal of NAND gate 242 to enable the seek routine to be undertaken.

By way of channel 256, the output of the optical coupler 252 serves to turn on the constant current source circuit 232. This enables the seek routine to be undertaken at a time when the arc voltage is not turned on.

Terminal 260 leads from microprocessor 140 to an optical coupler 262, the output of which is connected by way of line 166 to enable clipper output gates 158 and 162.

Microprocessor output terminal 270 leads to an optical coupler 272 whose output is connected by way of channel 274 to the transmission gate 118 to control the center sample from which the base current signal is developed.

Referring again to FIG. 5, trace A represents the raw weld current as appearing at terminal A; FIGS. 2–4. It will be noted that for this example the weld current varies radically from a value of about 100 amperes up to about 200 amperes.

Curve B is a plot, on the same scale as trace A, of the output of the clipper-voltage follower amplifier 116 and, more particularly, the wave form appearing at point B of FIG. 3. It will be noted that the wide variations due to the clipping action and filtering action are substantially eliminated.

Trace C is a plot of the weld current as it appears at terminal C of FIGS. 2–4. It will be noted that during the period of the sample gate C1 that there is a slight deviation of approximately 10% of the total weld current indicating that there is a difference between the instantaneous value of the weld current at the traverse center line and the average value as reflected by the output of the integrator.

Trace D represents the input to the voltage-to-frequency converter 134 and thus illustrates the portion D1 which is the voltage applied to converter 134 during the time gate C1. The portion of the curve D2 represents the wave form applied to converter 134 following the center line sample.

Section D3 is the area where the integration takes place. The voltage represented by the section D3 of trace D is thus the area that is involved in the integration at the end of the traverse following the center sample D1.

Thus, in accordance with the present invention, the output of gate 110 is applied to integrator 112, 114 which is a short-time constant integrator. The resultant voltage is applied by line 128 to one input of subtraction unit 126. Actuation of gate 118 at each traverse center point causes the integrator 120, 122 to obtain and retain a sample representative of the current at the center point. This sample appears at the output of voltage follower 124. The output of subtractor 126 represents the difference between the outputs of the two integrators which, thus in effect, serve as current signal conditioners or filters.

The output of subtractor 126 is gated through multiplexer 130 for conversion to a variable frequency signal by converter 134. The variable frequency signal output is selected on a time basis through lines 236 and 238 so that near the ends of each traverse the variable frequency signal is applied to microprocessor 140. Microprocessor 140 then counts the pulses for integration through use of a down counter as previously described.

The integration reference level is the number of pulses initially in the down counter. This is first generated during initial start-up and is modified dynamically during the welding operation. By conditioning the signals applied to the frequency converter 134, the control of the welding process through the microprocessor 140 has been found to be rendered far more reliable and versatile than in prior art systems.

In one embodiment of the invention, multiplexer 130 was of type CD4052. Converter 134 was of type AD537. Microprocessor controller 140 was of the type manufactured and sold by R.C.A. and identified as CDP18S601. Couplers 235, 237, 252, 262 and 272 were optical couplers identified as HCPL2502. The gates 110 and 118 were identified as BG201.

FIG. 6

Bug 20 of FIG. 1 is comprised of two main parts. A main bug housing has two sets of idlers 22 and 24 for following band 14. It contains a mechanism whereby the torch assembly 30 can be moved independently in accordance with any of arrows 44, 46 or 48 in FIG. 1. A second housing is a tractor assembly which is adjustably hinged to the main bug body and which itself is provided with two sets of idlers, such as idlers 22 and 24. In addition the second housing is provided with a mounting and drive motor for the tractor wheels 26 and 28, shown figuratively in FIG. 1.

Figure 6:
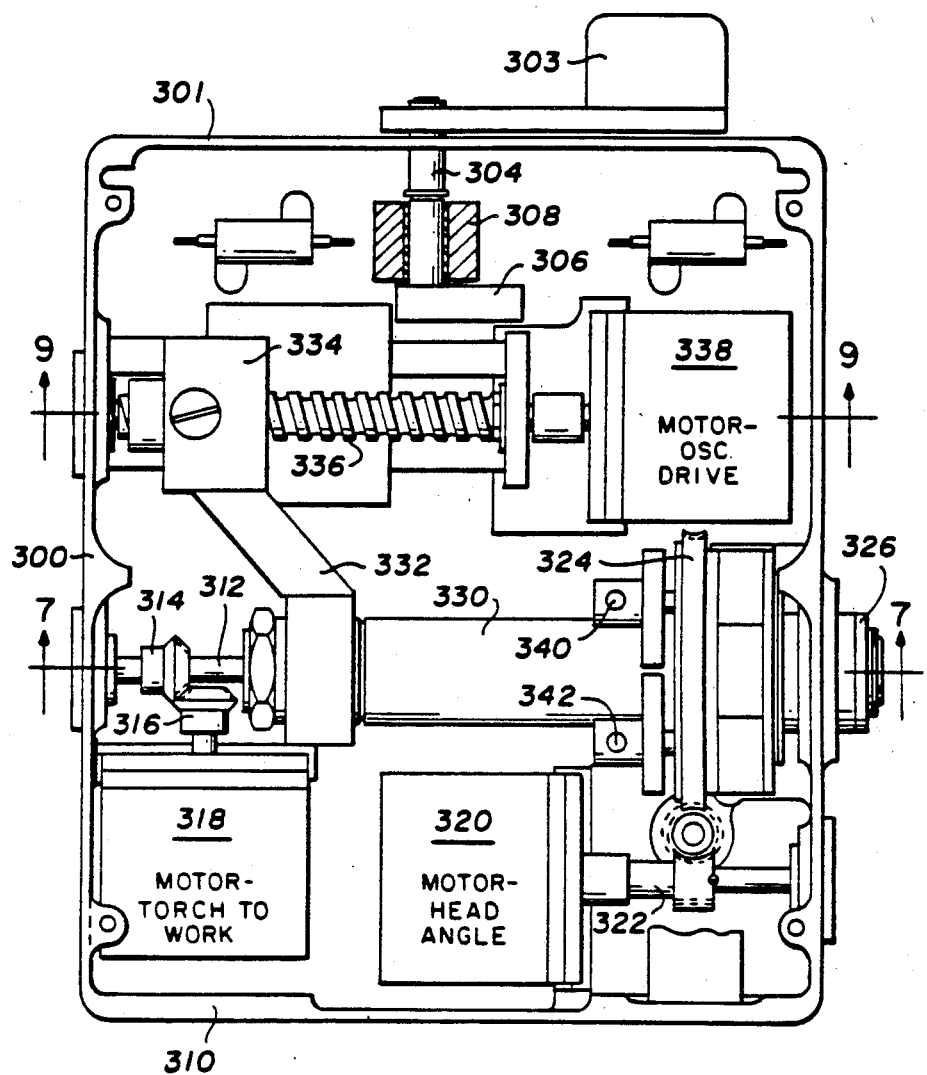
FIG. 6 is a top view of the main bug body interior.

FIG. 6 is a view of the inside arrangement of the main bug body such as viewed from line 6—6 of FIG. 1. The main bug body comprises a rectangular housing 300 having a free end 301 beneath which two sets of follower rollers such as follower rollers 22 and 24 are mounted and are actuated by way of a lever 303 which is coupled by way of a shaft 304 to an eccentric 306. Shaft 304 is mounted in a bearing 308.

The end 310 opposite the free end 301 is adapted to be hinged to a tractor assembly as will be described. The linkage may be such as to accommodate various sizes of pipes, generally in the manner disclosed in U.S. Pat. No. 3,844,468.

A splined shaft 312 extends laterally through the housing 300. A bevel gear 314 mounted on shaft 312 is driven by way of a bevel gear 316 on the output shaft of a motor 318. Motor 318 drives shaft 312 to control movement of the torch in the direction of arrow 46, FIG. 1. Motor 318 will thus be referred to as the torch-to-work motor. The coupling from shaft 312 to the torch assembly 30 will later be described.

A second motor 320 is mounted in housing 300 and is coupled through the assembly involving shaft 312 to adjust the head angle, i.e., the angle between the axis of the nozzle 40 FIG. 1 and the surface over which the bug travels. Thus motor 320 will be designated as the head angle motor. Motor 320 drives an output shaft 322 which, through a suitable gear train causes a large ring gear 324 to rotate causing the main tubular shaft member end flange 326 to rotate. The torch assembly 30 is to be connected to the flange 326 so that as the gear 324 is rotated the head angle of the torch assembly will be changed.

As previously mentioned, shaft 312 supports an enlarged tubular outer main shaft 330. At the inboard end of shaft 330 there is mounted a follower arm 332. Arm 332 has a traveling nut mounted in the end 334 thereof which follows a worm gear 336. Gear 336 is driven by a motor 338. Motor 338 is an oscillator drive motor. It is a motor that causes shaft 330 with its end flange 326 to move in and out in accordance with the motion represented by arrow 48 of FIG. 1. Thus motor 338 is designated as the oscillator drive motor.

Main shaft 330 is flattened on opposite sides. The flat portions are engaged by follower rollers mounted on shafts 340 and 342 so that as motor 320 is actuated the motion of gear 324 will be transmitted to main shaft 330 through the rollers mounted on shafts 340 and 342, at the same time accommodating the oscillation produced by actuation of the drive motor 338.

Figure 7:
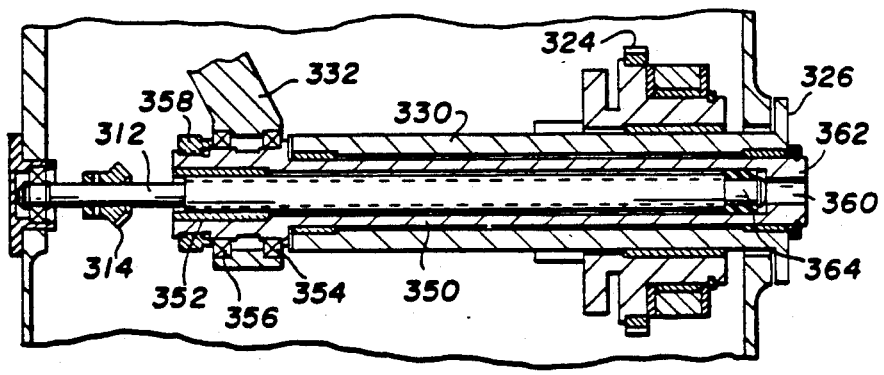
FIG. 7 is a partial sectional view taken along lines 7—7 of FIG. 6.

In order to better understand the functions carried out through shaft 312 and 330 reference should now be had to FIG. 7 where a sectional view of the triple function shaft is shown.

FIG. 7

The splined shaft 312 extends coaxially through the main shaft 330. An intermediate shaft 350 has a spline bushing 352 mounted in the left end thereof. Arm 332 is mounted on bearings 354 and 356 on the end of the intermediate shaft 350 so that shaft 350 may rotate relative to arm 332. Bearings 354 and 356 are fixed in place by action of an end nut 358 which is served on the end of intermediate shaft 350. Thus as shaft 312 rotates, the splines on the exterior surface thereof register in spline bushing 352. This causes the intermediate shaft 350 to rotate. Intermediate shaft 350 is provided with an end bore 360 with a keyway 362 therein. The end of shaft 312 opposite bevel gear 314 is mounted in an idler bearing 364.

Thus the shaft arrangement shown in FIG. 7 permits the intermediate shaft 350 to be driven from motor 318 to adjust the head angle. It accommodates rotation of the end flange 326 in response to actuation of motor 320 which drives the main shaft 330 through gear 324. It also permits transmission of rotary motion of the shaft 350 to the torch assembly 30 to adjust the torch to work distance.

FIG. 8

Figure 8:
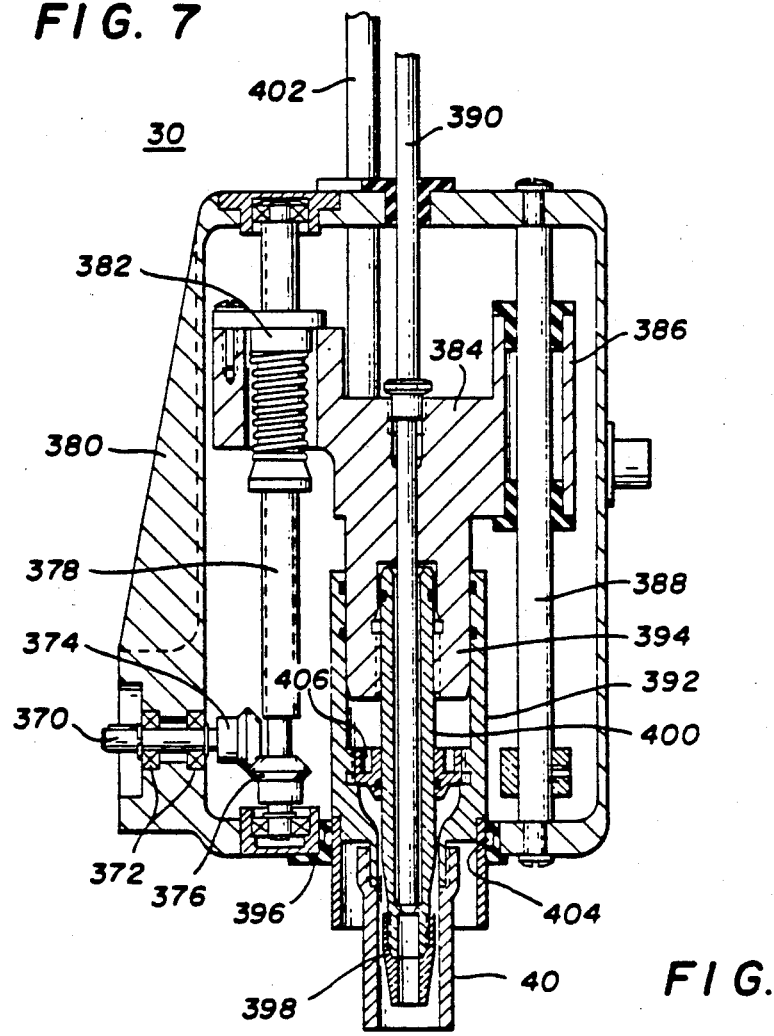
FIG. 8 is an elevation sectional view showing the torch assembly of FIG. 1.

Referring now to FIG. 8 the torch assembly 30 is illustrated in a sectional view with the keyed input shaft 370 shown in position to be inserted into the end bore 360 of FIG. 7. Shaft 370 is journaled in bearings 372 and has a pinion 374 mounted on the end thereof. Pinion 374 mates with pinion 376 which is mounted on a shaft 378. Shaft 378 extends vertically through the housing 380 of the head assembly. Shaft 378 is threaded to form a lead screw on which there is mounted an antibacklash follower nut 382. As shaft 370 is rotated, the lead screw on shaft 378 rotates causing the nut 382 to move up or down. The nut 382 supports the torch assembly including a torch body 384. Torch body 384 includes a guide arm 386 which follows a guide post 388 which is parallel to the lead screw on shaft 378.

The torch body 384 is center bored to receive the filler wire guide tube 390. The lower end of the body 384 is a cylindrical section 394 and is counterbored from the bottom. A cylindrical nozzle body 392 is mounted on the cylindrical section 394 of the torch body 384 and extends downward through an insulating lower bushing 396 in the bottom of the housing 380. A nozzle 398 is mounted in the end of cylindrical nozzle body 392.

Mounted inside the counterbore of cylindrical section 394 of the torch body 384 is a welding tip through which the feed wire from tube 390 is threaded.

The nut 382 and the bushings in guide arm 386 which support torch body 384 are of insulating material for electrical isolation of the parts thereof relative to the housing 380. Cylindrical nozzle body 392 and the central nozzle structure 400 are electrically conductive.

Pressure seals are provided between the cylindrical section 394 of the torch body 384 and the cylindrical parts 392 and 400.

Pressurized shielding gas is applied through tube 402 to pressurize the cavity 404. A gas lens 406 mounted in insert 392 evenly distributes the flow of gas down through the annulus between the inner walls of insert 392 and the outer walls of the member 400 so that a uniform cylindrical sheath of gas flows out of nozzle 40 and shields the arc produced as the filler wire in tube 390 contacts work below nozzle 40 for the establishment and utilization of an arc.

FIG. 9

Figure 9:
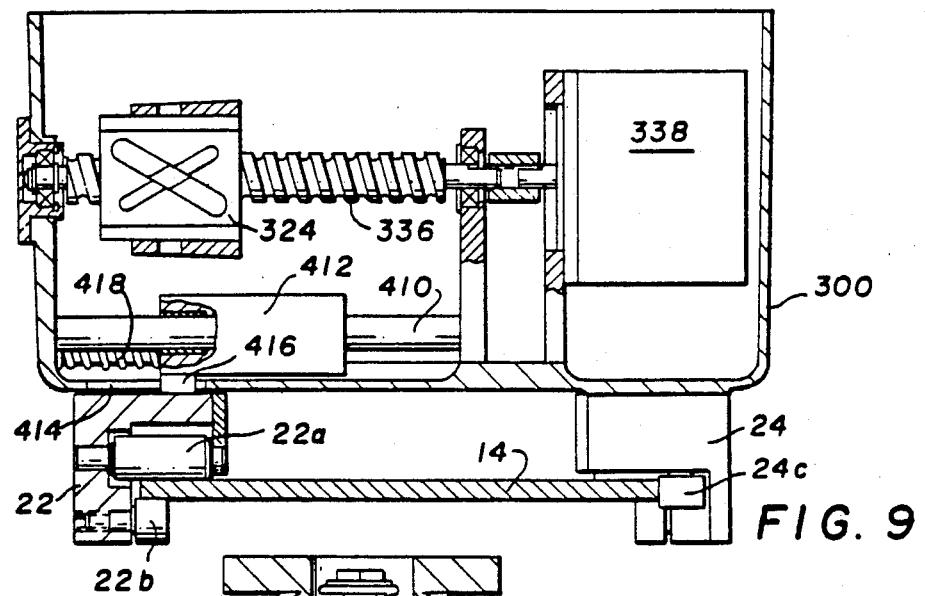
FIG. 9 is a sectional view taken along the lines 9—9 of FIG. 6.

In FIG. 9, a cross-section of a portion of the main bug housing taken along lines 9—9 of FIG. 6 illustrates the worm gear 336 with its ring gear 324 with worm gear 336 driven by motor 338.

Also illustrated in FIG. 9 are further details of the followers 22 and 24. The set of followers 24 is mounted in a fixed relation on the bottom of housing 300. In contrast, the set of followers 22 is mounted on a shaft 410 which is supported from the walls of the housing 300 and is positioned near the bottom of the housing 300. A slider 412 is mounted on shaft 410 and is coupled through a slot 414 by a spacer 416 to the frame in which the followers 22 are mounted. The slider 412 is urged by spring 418 toward followers 24. The eccentric 306, FIG. 6, as actuated by lever 303, FIG. 6, serves to move slider 412 away from followers 24 in order to permit the bug to be mounted onto the guideband 14. When mounted, the set of followers 22 includes roller 22a which engages the outer surface of band 14. Roller 22b engages the inner surface of band 14. A third roller, such as roller 24c, engages the edge of band 14.

FIG. 10

Figure 10:
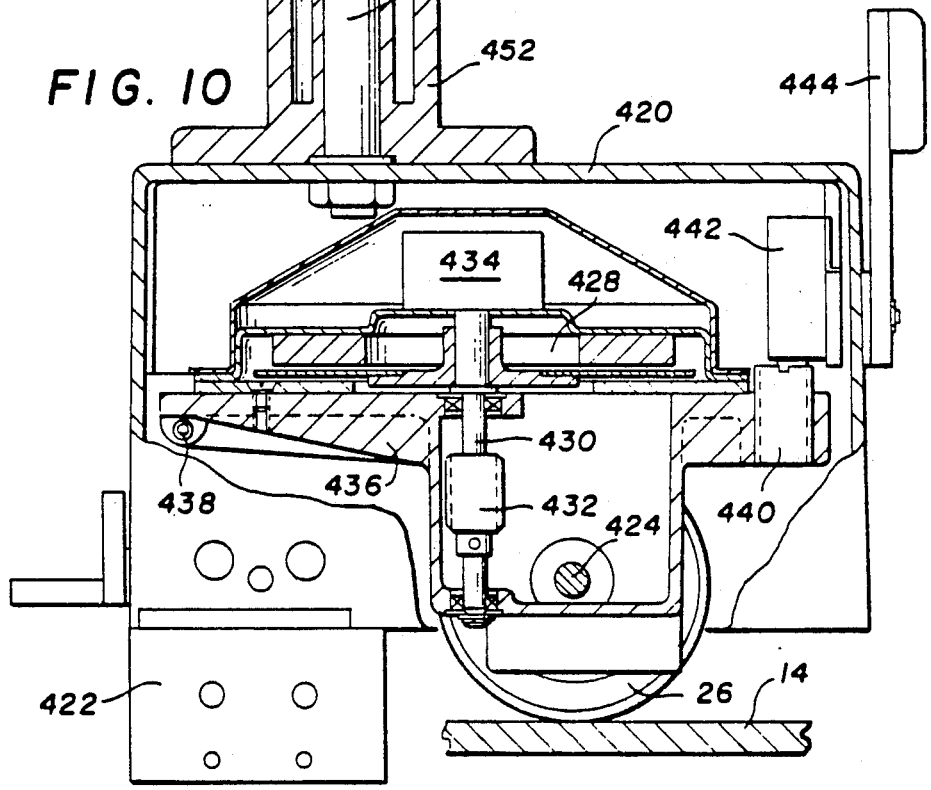
FIG. 10 is an elevation view partially in section of the traction assembly.

FIG. 10 is a cross-sectional view of the tractor assembly forming the second part of the welding bug. The tractor assembly has a housing 420 provided with two sets of band followers. One set is mounted on the frame member 422.

A shaft 424 supports the drive wheel 26. Drive wheel 26 is driven by a pancake motor 428 by way of shaft 430 and output gear 432. Gear 432 is connected through a suitable drive train to drive shaft 424. Motor 428 is provided with an optical encoder 434. The motor 428 is mounted on a subframe 436 which also supports shaft 424. The frame 436 is pivoted on a cross shaft 438 at one end of the housing 420. Thus, the motor 428 and the drive wheel 26 are rotatable about shaft 438. A spring-biased plunger 440 is mounted in frame 436 at the end thereof opposite shaft 438. An eccentric 442 mounted on a shaft common to crank arm 444 is utilized to apply a downward force through the spring-biased plunger 440 to force the drive wheel 26 onto the surface of the band 14 in order to generate the desired tractive force from motor 428 through wheel 26.

A spindle 450 is mounted in the top of housing 420 and serves to support a bobbin 452 on which a spool of filler wire may be mounted in order to supply the torch assembly 30 of FIGS. 1 and 8.

The tractor assembly housing 420 of FIG. 10 is to be hingedly coupled to the confronting end 310 of the main bug housing 300, FIG. 6. The coupling (not shown) may be of the type to permit the followers 22 and 24 on the main bug housing 300 and the followers such as followers in set 422, FIG. 10, both to be mounted on band 14 with the angle between the housings adjustable to accommodate different diameters of pipe to be welded.

B. Control System With Power Integration

In the system described in section A above, the welding current was integrated over a window near the end of each traverse of the torch assembly 30 to provide a control signal to reverse the motion of the torch assembly 30 when the integration value reached a predetermined constant. While this technique has proven somewhat successful, it has been found that the integration of torch power values during a similar window, and more precisely, the change in relative absolute power values, provides a more accurate control signal to control the reversal of the torch assembly 30. This power integration system is described hereinafter with reference to FIGS. 11-15. However, it will be understood that many of the principals of operation of the power integration system are analogous to those for the current integration system previously described.

For the power integration system, an integration constant $\Delta C$ is determined which is related to the desired actual fusion heat input into the sidewall of the weld. This constant is determined experimentally by measuring and averaging several integrations of the product of the absolute difference between the actual voltage and centerline voltage and the actual current and centerline current during a window which begins at a predetermined distance from a known sidewall position and ends at the sidewall. By integrating power values versus time in an integration window near the sidewall and comparing this summation to the fixed integration constant, it then becomes possible to determine the actual traverse distance required versus time during the integration window as the torch assembly 30 traverses from the beginning of the integration window to the limit of its traverse at the sidewall. The integration window is begun the predetermined distance from the sidewall as the torch 30 traverses toward the sidewall, with the position of the side wall being estimated based on the position of the sidewall at the last traverse. If the sidewall has moved inward, narrowing the gap, the integration totals to the integration constant is less in traversing distance because of the more radical voltage and current variations, reversing the traverse. Correspondingly, if the sidewall moves outwardly, widening the groove, the integration requires a longer travel to reach the integration constant. Thus, the integration window can vary, but always begins the predetermined distance from the wall position estimated from the previous wall position. A revised centerline position is also calculated after each traverse cycle. This is the method by which the system insures the proper sidewall fusion.

In the power integration technique, the operations taken to initialize and run the system are the same as operation 1–18 in the operations section under the heading "A", set out hereinbefore, except that power values and variation are measured and analyzed rather than simply current.

In order to implement this power integration control, it is necessary to use filtering techniques to extract the normal welding disturbance characteristics from the welding current and voltage to determine a base line value of voltage and current. Reference to the top graph in FIG. 5 is recommended to illustrate the normal disturbance characteristics of the welding current. This elimination of disturbance does not invalidate the integration because the disturbances are a result of periodic changes or process phenomenon not related to the control of the track assembly traversal.

During actual wave form analysis of a welding process, it was determined that the variation in base line voltage and current signals across the traverse of the weld are less than 10% of the composite welding signals. Therefore, it was determined that in order to have maximum sensitivity in the welding system, it would be necessary to extract or remove the background welding voltages and currents and measure the relative changes in these values across the traverse. This relationship also allows the filter network to have a very narrow pass band.

Figure 14A:
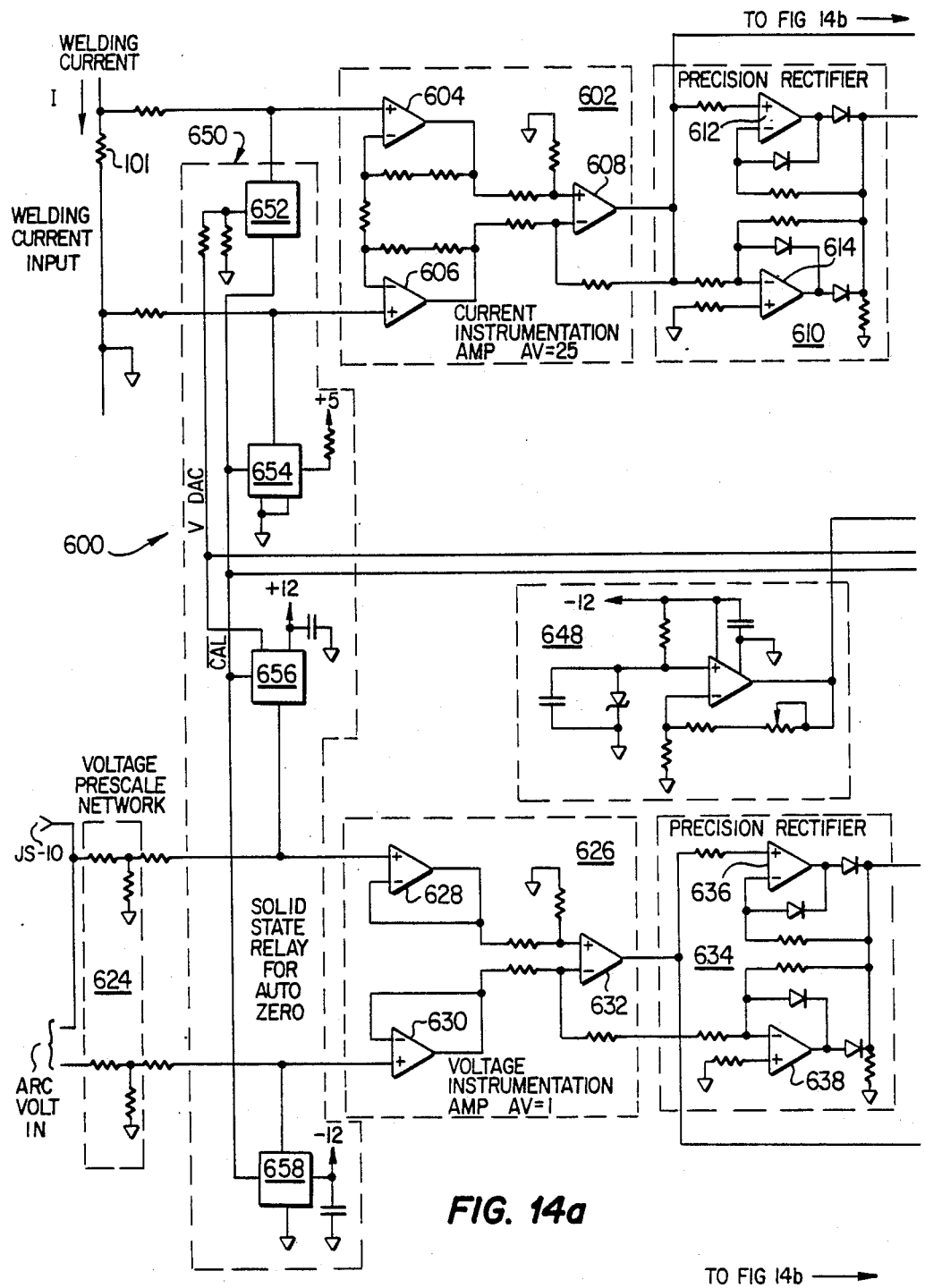
FIGS. 14a, 14b, 15a and 15b comprise a circuit diagram illustrating the analog portion of the pipeline welding system using power integration.
Figure 14B:
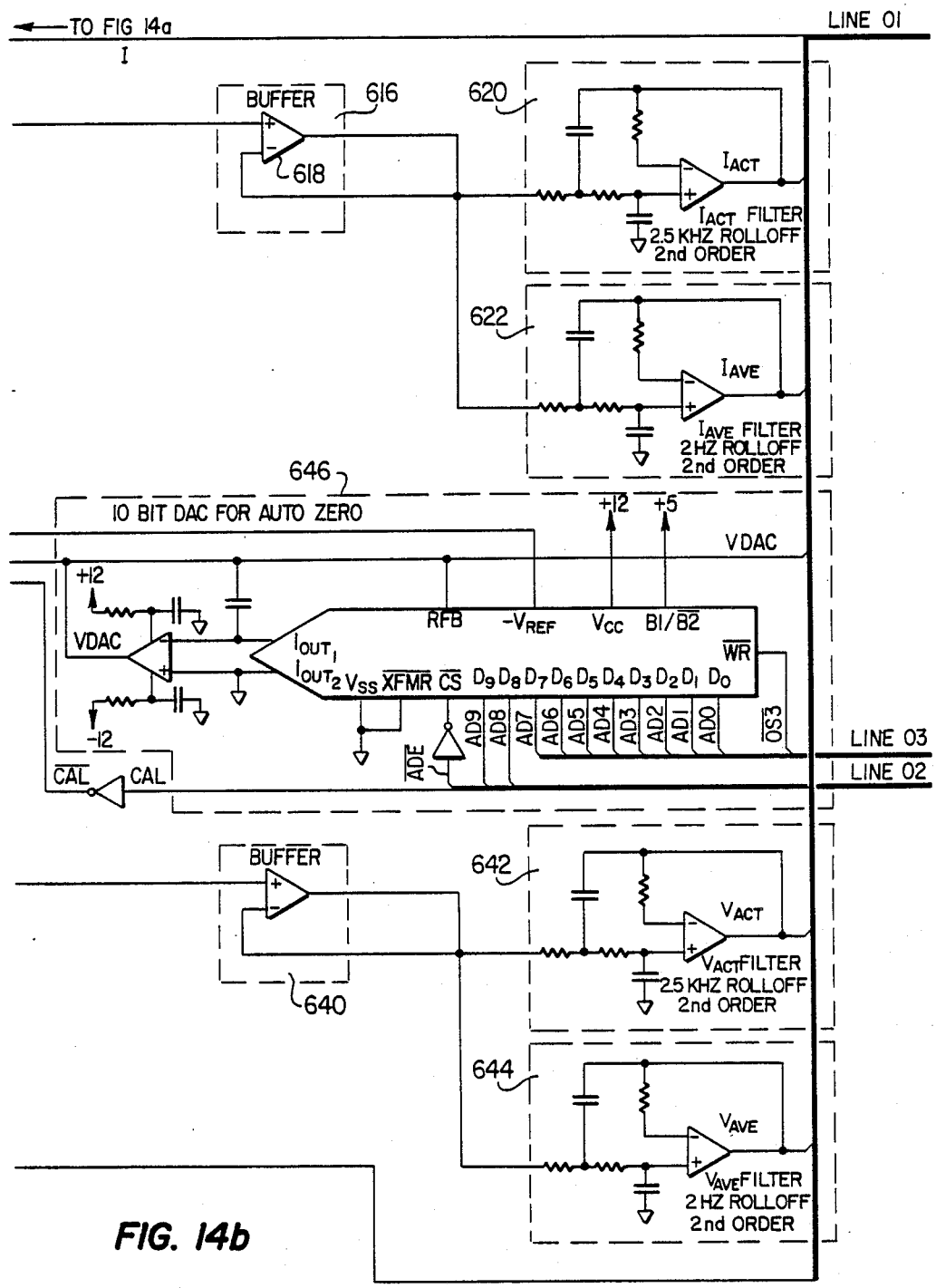
Figure 15A:
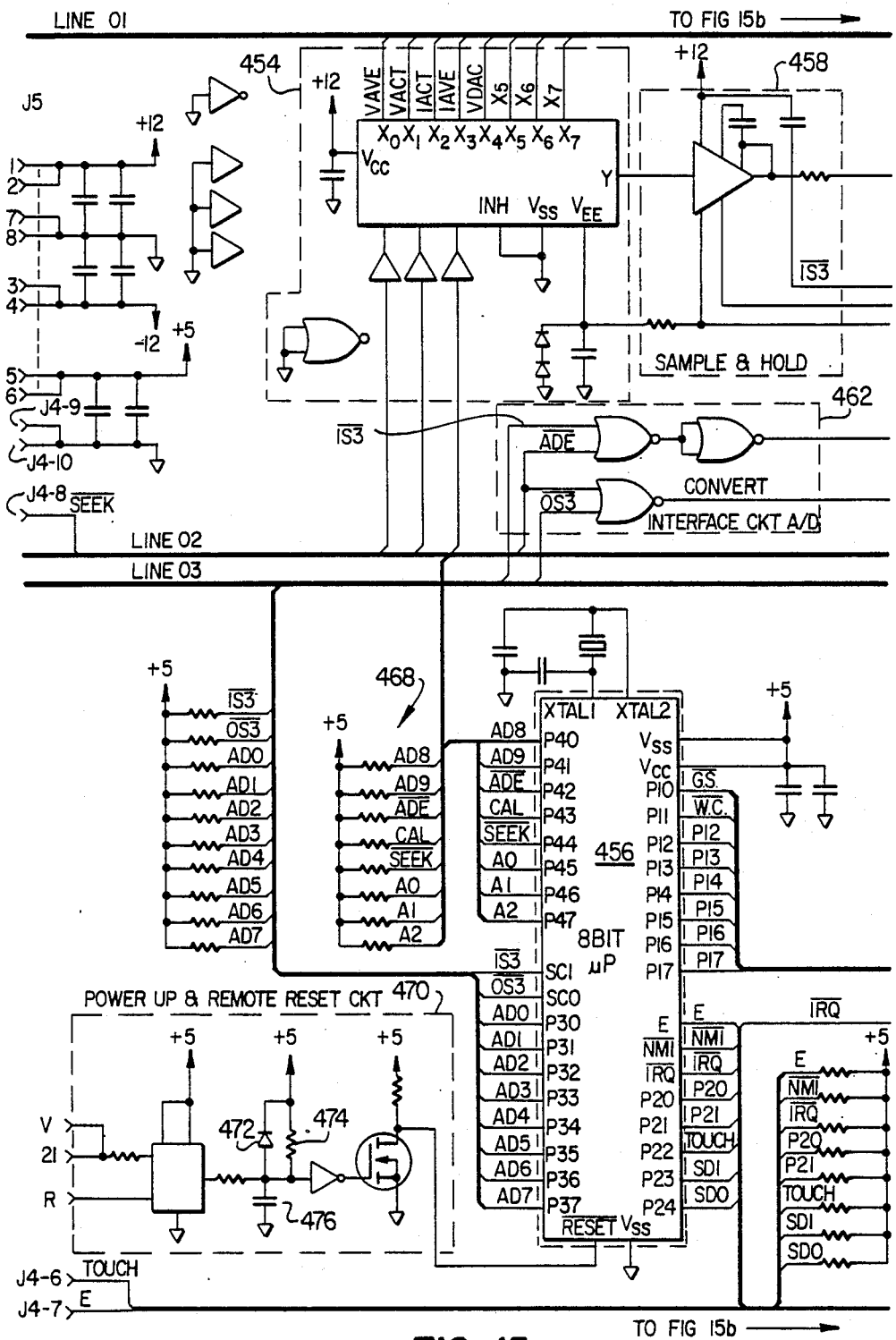
Figure 15B:
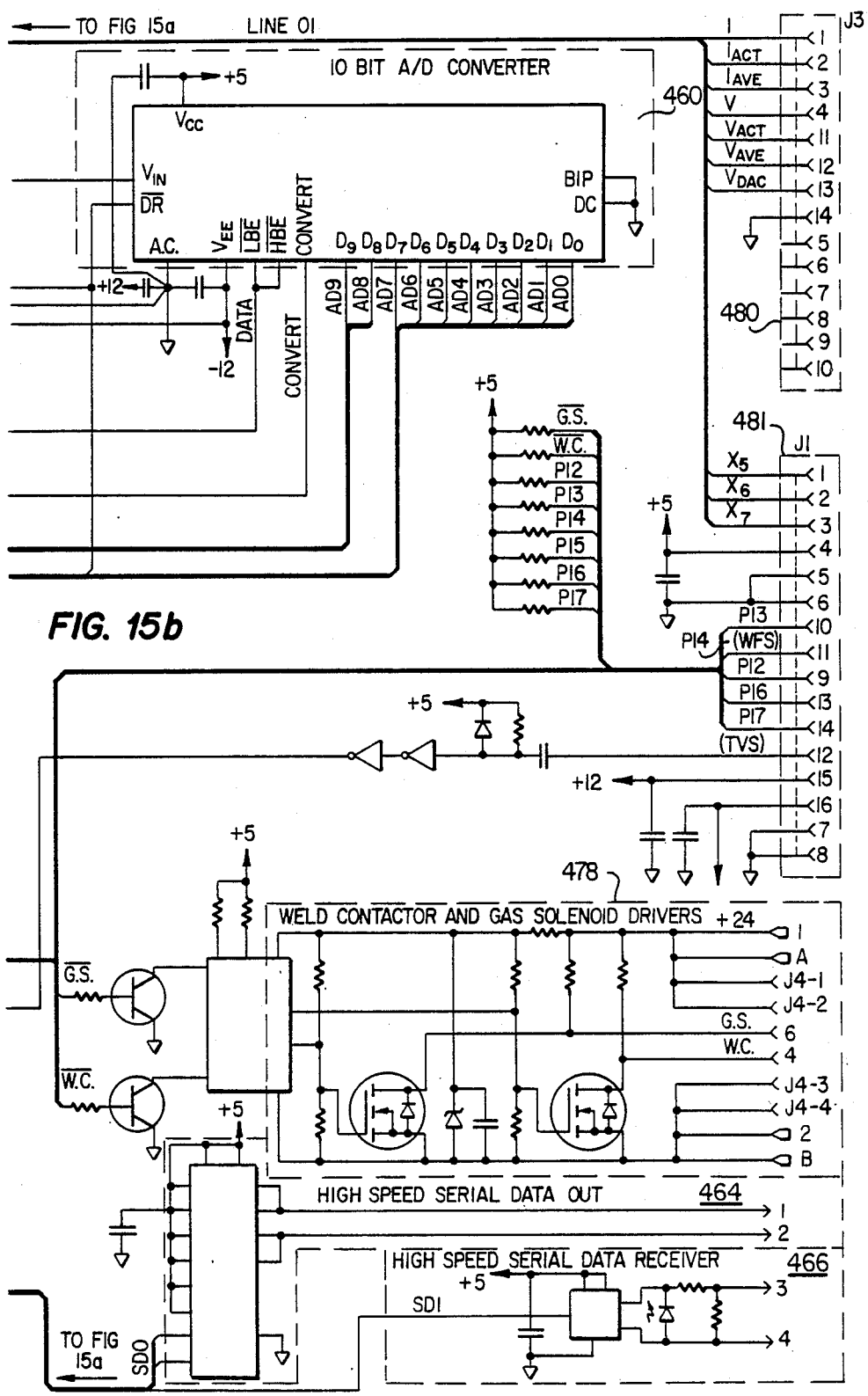

With reference now to FIGS. 14 and 15, arc voltage and welding current is sensed at the input of a signal conditioning PC card 600. The welding current is sensed across shunt 101, while the arc welding voltage is sensed between terminal 200 and ground. In the preferred embodiment, the shunt 101 provides a voltage relationship between the terminals thereof of 50 millivolts for a 250 amp current.

The current signal is entered into current instrumentation amplifier 602 formed by amplifiers 604, 606 and 608. In the preferred embodiment, the amplifier 602 provides an amplification factor of 25.

The output of amplifier 602 is provided to a precision rectifier 610. Rectifier 610 is provided with amplifiers 612 and 614. The purpose of rectifier 610 is to assure that the current signal processed subsequently by the analog to digital (A/D) converter is always positive. Therefore, the present system can be employed while welding in DC straight polarity or reverse polarity or even alternating current as rectifier 610 always converts the current signals to a positive value for subsequent input into the A/D converter.

Buffer 616, formed with amplifier 618 is an interface between the precision rectifier 610 and current filters 620 and 622.

The filter 620 is a low pass filter that eliminates the high frequency components of the welding current to provide an output identified as $I_{act.}$, the actual current measured. In the preferred embodiment, the filter 620 rolls off at about 2½ KHz and is a second order filter.

The filter 622 is a very low frequency roll off filter that provides an output identified as $I_{ave.}$, an average current reading. This output current is used for heat input calculations and for display purposes, and not part of the traversing control system described herein. In the preferred embodiment, filter 622 has a roll off frequency of about 2 Hz. This filter is particularly effective in short arc welding with the arc going on and off frequently.

The arc voltage signal is conditioned in a manner similar to the welding current signal. A voltage prescale network 624 is provided to condition the arc voltage signal to scale the voltage signal to the current signal. In the preferred embodiment, the arc voltage signal is decreased by a factor of 10 by network 624. Thus, for an arc voltage range from 0–100 volts, the output of network 624 ranges between 0 and 10 volts. The current is scaled in a similar manner. In the preferred embodiment, the output of the current conditioning circuits converts a current in the range from 0 to 1000 amps to a voltage signal from 0 to 10 volts. Thus, a 2½ volt signal from the welding current circuit would represent a current of 250 amps.

The arc voltage signal is provided to voltage instrumentation amplifier 626 after scaling. The amplifier includes amplifiers 628, 630 and 632. In the preferred embodiment, amplifier 626 provides an amplification factor of about 1.

The output of the amplifier 626 is provided to a precision rectifier 634. Rectifier 634 is provided with amplifiers 636 and 638. Rectifier 634 operates in substantially the same way for substantially the same purpose as the rectifier 610.

The output of rectifier 634 is provided to a buffer 640 which acts as an interface between the rectifier 634 and voltage filters 642 and 644. Filter 642 provides a low frequency roll off, again to eliminate high frequency components of the welding voltage. In the preferred embodiment, filter 642 has a 2.5 KHz roll off and is a second order filter. The output of filter 642, identified as $V_{act}$, represents actual arc voltage as conditioned. Filter 644, as filter 622, does not form a part of the current integration control system for the torch assembly traversal. Again, filter 644 is a very low frequency roll off filter which has an output identified as $V_{ave}$, employed in a manner similar to the value $I_{ave}$ output from filter 622. The filter 644 also preferably has a roll off frequency of about 2 Hz and is a second order filter.

A calibrating circuit is provided for calibrating the current and voltage signal conditioning circuits which includes a 10 bit digital to analog (DAC) 646 for an auto zero. The calibrating circuit also includes a control voltage circuit 648 which preferably generates a voltage output between 0 to 10.24 volts and provides a negative reference voltage for DAC 646. The 10 bit DAC 646 is coupled to the front end of the current amplifier 602 and voltage amplifier 626 by a solid state relay 650 comprising transmission gates 652–658. In the auto zero routine discussed in the flow charts of FIGS. 11–13, various known voltage levels are indexed from the 10 bit DAC 646 into amplifiers 602 and 626 and the output of the conditioned welding current and arc voltage signals are read to provide calibration. Preferably, 4 samples of data at different current and voltage levels are taken. For example, current samples at 100, 200, 400 and 800 amps are suitable. Such samples provide a calibration curve for both current and voltage. The incoming signals can thus be linearized. During welding, the 10 bit DAC 646 and the remainder of the calibration circuit are not employed.

With reference now to FIG. 15, the various outputs carrying the conditioned actual and average voltage, actual and average current and DAC voltage are provided to an 8 channel multiplexer 454. A microprocessor 456 determines which input to the multiplexer is routed through the multiplexer to a sample and hold circuit 458. For example, the microprocessor 456 can direct the multiplexer 454 to provide the average voltage signal to the sample and hold circuit 458, and all other signal inputs in a desired sequence.

The sample and hold circuit 458 orovides the selected signal to an analog to digital (A/D) converter 460 which converts the analog value of, for example, actual voltage or current, to a digital signal. Upon conversion, the converter 460 communicates the digitalized signal to the microprocessor 456 through an interface circuit 462. Microprocessor 456 then instructs circuit 458 to cease storage of the signal in preparation for digitizing the next value desired.

The digital data from converter 460 is provided through microprocessor 456 to integrate the power values and instruct a host computer (not shown) when the traverse is to be halted. The host computer actuallv runs the traversing mechanism for the torch assembly 30. The data link between the microprocessor 456 and the host computer is established through a high speed serial data output loop 464 and a high speed serial data receiver circuit 466.

Toward the left in FIG. 15 is illustrated a series of pull up resistors 468 for the data bus. These resistors are required for running the CMOS components against the NMOS components.

A power up and remote reset circuit 470 is also provided. Diode 472, resistor 474 and capacitor 476 create a power up pulse which resets the microprocessor 456 when the power is turned on to initialize the circuit. The remote reset is controllable by the host computer and provides a method to reset the microprocessor.

A weld contactor and gas solenoid driver circuit 478 are provided for actually turning on the welding arc and the shielding gas at nozzle 40 for the welding process.

Analog output 480 can be provided for testing. An optional input/output port 481 is provided for expansion, if desired.

Figure 11:
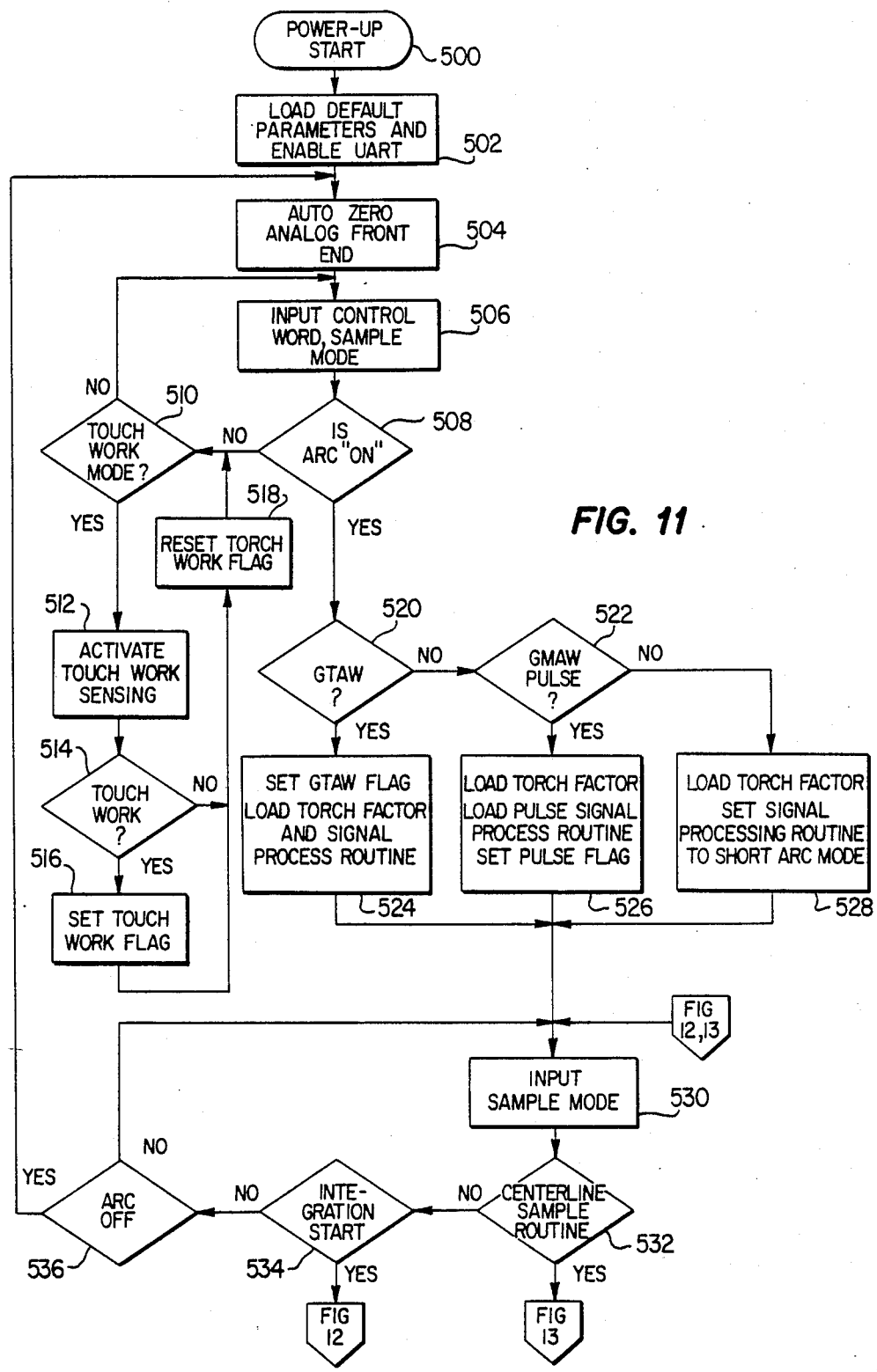
FIGS. 11, 12 and 13 illustrate a logic flow chart for signal conditioning and controlling a pipeline welding operation by power integration.
Figure 12:
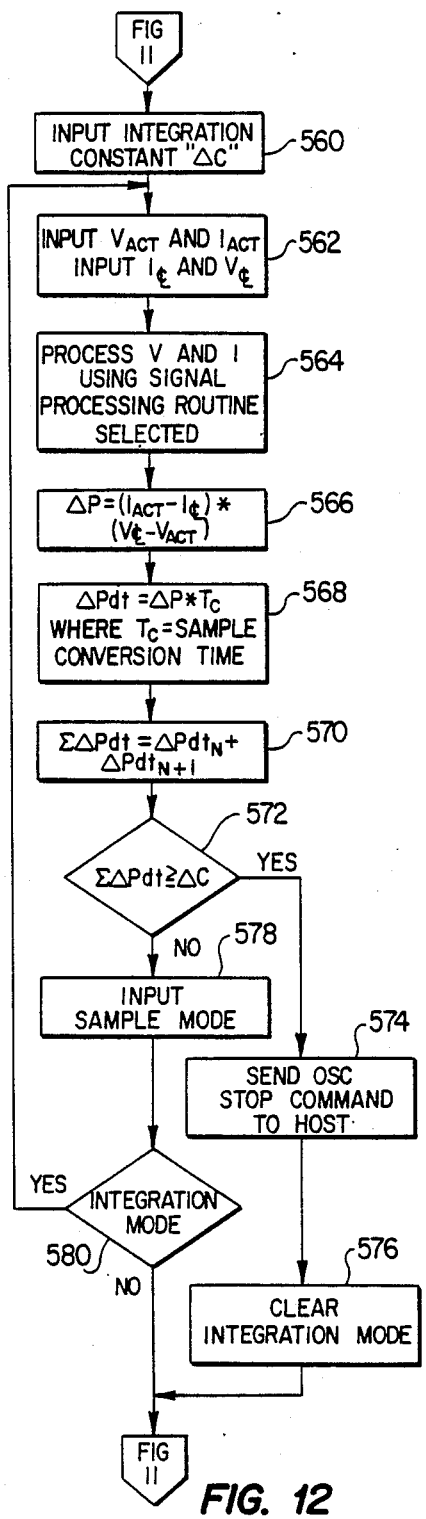
Figure 13:
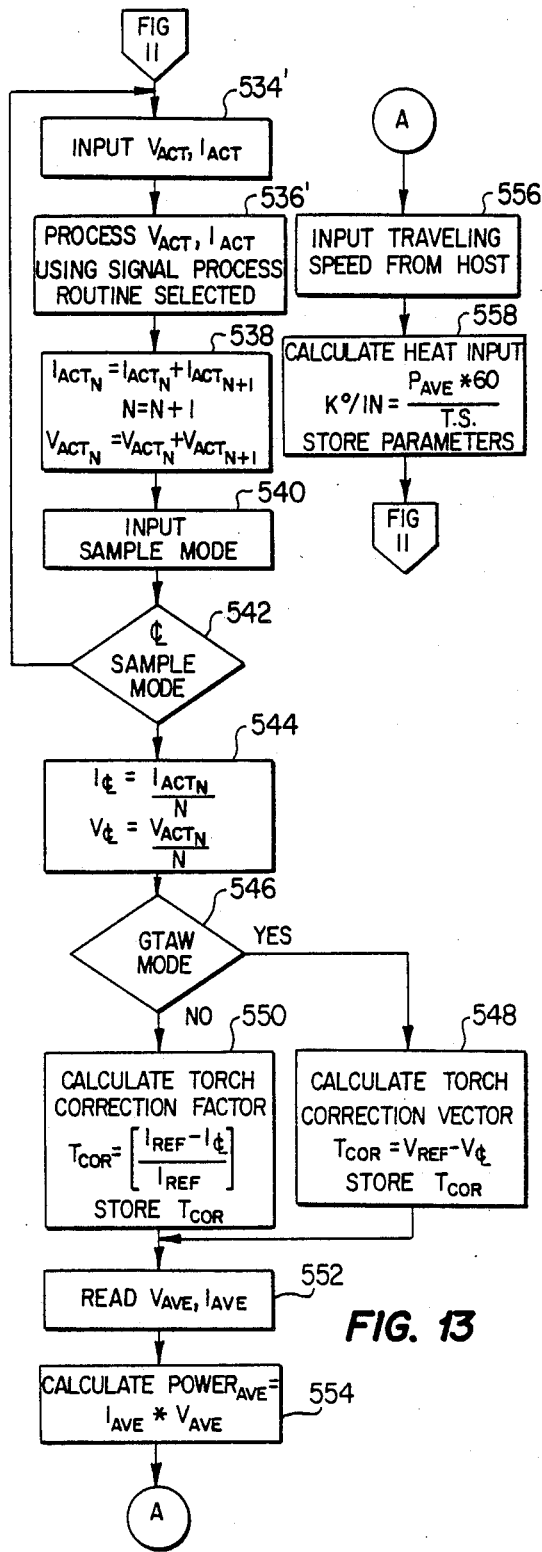

With reference now to FIGS. 11–13, the flow chart of the present system is illustrated. The functions set forth in these flow charts are performed for the most part in microprocessor 456. Step 500 represents the initial activation of the welding system. Step 502 represents the subsequent loading of the default parameters and enablement of the UART (universal Asynchronous Receiver Transmitter) run on an interrupt service routine.

Step 504 represents the auto zero operation provided by the 10 bit DAC 646 and related components to calibrate the front end of the system as formed by card 600.

Step 506 represents the input of control words and sample modes by the host computer. This includes the positioning information, i.e., where the torch assembly 30 is located, and whether or not it is running. Step 508 represents a determination as whether the welding arc is on or not. If not, step 510 represents the inquiry to determine if the touch work mode is activated. If activated, steps 512–518 represent the setting of the touch work flag until the touch work mode is complete.

The loop continues until the welding arc is turned on. Once the arc is on, a determination is made as to the type of weld being provided. As represented by step 520, a determination is made whether the weld is a gas tig arc weld (GTAW). If not, the weld is a gas metal arc weld (GMAW). Step 522 represents the determination as to whether the GMAW weld is a pulse weld or not. Steps 520 and 522 are required, as each of the particular welding techniques necesitates input of different torch factors and different process routines. Steps 524–528 represent the implementation of the various torch factors and routines for the particular weld employed.

A determination is then made in step 530 to determine if an input sample mode is in effect. Initially, a determination is made as to whether the sample mode is the centerline sample routine as set forth in step 532. If so, the logic path identified in FIG. 13 is implemented. If not, an inquiry is made as to whether the sample mode is the start of the integration phase as represented by step 534. If so, the logic path illustrated in FIG. 12 is undertaken. If neither mode is employed, and the arc remains on, step 536 repeats the sample loop until the arc is turned off.

With reference to the logic steps involved in measuring the centerline power, reference is now had to FIG. 13. The comouter determines the point at which the centerline voltage and current is sensed by finding the mid-point between the traverse limits of the immediately previous traverse cycle. At that point, the actual voltaqe and current are measured and input to the microprocessor 456 as represented by step 534'. These actual voltage and current signals are processed by using the particular signal processing routine selected for the welding process (i.e., tig, pulse mig or nonpulse mig) as represented at step 536'. The processed voltaqe and current samples are then added to previously stored centerline voltage and current samples measured in previous centerline traverses and the number of samples stored is incremented by one as represented by step 538. Such sampling is continued, as represented by steps 540 and 542, until the centerline power measurement is concluded. Once concluded, the average centerline current and voltage is calculated by dividing the individual total current and voltage signal summations by the number of samples as represented by step 544.

A determination is made as to the mode of welding as represented by step 546. If tig welding is used, a torch correction factor is calculated which represents the difference in arc voltage between the desired voltage and the actual running voltage for the torch correction as represented by step 548. If a mig weld is used, the torch correction is found by looking at the difference between the reference current and the most recent centerline sample divided by the reference value to end up in a percentage change representing the torch correction factor as represented by step 550.

Steps 552–558 represent the calculation of a $V_{ave}$ and $I_{ave}$. These values can be used to calculate a power average for meter display. By inputing the travel speed of the torch assembly 30 from the host computer, a calculation of heat input can also be made for display purposes.

Referring now to FIG. 12, when the computer initiates the integration window, the integration constant, $\Delta C$, is input as represented by step 560. The instantaneous actual voltage and current is measured for a short sampling period represented by dt and processed in steps 562 and 564. A change in power, $\Delta P$, is then calculated by taking the instantaneous actual current and subtracting the averaged centerline current stored and multiplying that product times the difference between the average centerline voltage and the instantaneous actual voltage sensed. The calculation is represented by step 566. The arc current will always increase from the centerline toward the sidewalls. In constrast, the arc voltage will decrease from the centerline to the sidewall. The equation illustrated in step 566 therefore inevitably produces a positive value of power change, $\Delta P$. However, the absolute value of the current differences and voltage differences can also be calculated to ensure that the power change is always a positive value.

The power change is then multiplied by the time increment of the sample, dt or Tc, as renresented in step 568. Measurement of instantaneous power and current calculation of $\Delta P$ are made for each subsequent time interval dt and a summation of each product of $\Delta P$ dt is made as represented in step 570. The summation value is then compared to the integration constant $\Delta C$ as represented in step 572. If the summation is greater than or equal to the integration constant, this directs the torch assembly 30 to stop movement towards the sidewall and reverse the motion. Upon reversal, the integration mode is cleared, as represented by step 576, and the loop begins again to sense the centerline power as the torch assembly 30 passes the centerline and to integrate in a window at the opposite sidewall until the integration constant is achieved at the opposite sidewall, signaling a reverse to repeat the cycle.

As represented by steps 578 and 580, input samples are taken until the summation of the power changes times the sample time exceed or equal the integration constant.

In one embodiment, sampling is performed at a 6K Hz rate with a sample time of about 30–40 microseconds. This equates to a window of about 25 ten thousandths of an inch in width.

In one embodiment of the invention, microprocessor 456 was a Motorola MC68701. Multiplexer 454 was a Motorola MC14051. A/D converter 460 was an Analog Devices AD573KD. The 10 bit DAC was a National DAC1006.

I claim:

1. A method for automatic welding in which a weld torch follows a groove while making lateral traverses across the groove, comprising the steps of:
   measuring weld voltage and current as said torch passes the centerline of said groove,
   sequentially sampling weld voltage and current as said torch passes through a position window toward each wall of said groove,
   integrating the product of (1) the absolute difference of said sampled weld voltage and said centerline voltage, and (2) the absolute difference of said sampled weld current and said centerline current to produce an integration value, and
   reversing the lateral travel of said torch when said integration value reaches a predetermined constant.

2. The method as recited in claim 1 wherein said weld voltage and current measured at said centerline is an average of multiple centerline weld voltage and current measurements.

3. The method recited in claim 1 wherein said centerline is the midpoint between previous reversal positions of said torch at opposite walls of said groove.

4. The method recited in claim 1 including the step of reversing said torch prior to said integration value reaching said predetermined constant when said torch reaches a stop limit distance from said centerline.

5. In automatic arc welding where a weld torch follows lateral traverses across a groove during travel along the length of the groove and the weld torch provides an arc current and an arc voltage, the combination comprising:
   means to establish a power integration constant representing a desired power input from the weld torch as it travels from a predetermined distance away from a sidewall of the groove to the sidewall;
   means to provide a running average of the arc current and arc voltage at the centerline of the groove;
   means for integrating the product of the absolute difference between the instantaneous arc voltage and centerline voltage and the absolute difference between the instantaneous arc current and centerline arc current from the beginning of an integration window started a predetermined distance from the last known position of a sidewall; and
   means to halt the motion of the weld torch when the integration value equals the integration constant and reverse the motion of the weld torch.

6. The automatic arc welding of claim 5 wherein the integration window is begun the predetermined distance from the position of the sidewall during the previous traverse.

7. In the automatic arc welding of claim 5, wherein the combination further includes means for filtering disturbances out of the instantaneous current and voltage measured.

8. In automatic arc welding where a weld torch follows lateral traverses across a groove during travel along the length of said groove and the weld torch provides an arc current and an arc voltage, the combination comprising:
   means for establishing an initial centerline to the groove;
   means for initially determining the position of the sidewalls of the groove;
   means for determining an integration constant representative of the integration of a power product of (1) the absolute difference of the instantaneous arc voltage and the arc voltage at the centerline and (2) the absolute difference of the instantaneous current and the centerline current as the weld torch travels through an integration window beginning a predetermined distance from a sidewall and ending at the sidewall; and
   means for integrating the power product as the weld torch approaches the sidewall in subsequent traverses, beginning the integration the predetermined distance from the last known sidewall position and reversing the traverse of the weld torch when the integration value equals the integration constant previously determined, the position of the centerline being the midpoint between the positions of the sidewalls sensed in the last traverse.

* * * * *